United States Patent
Maeda et al.

(10) Patent No.: US 12,088,969 B2
(45) Date of Patent: Sep. 10, 2024

(54) PROJECTION DISPLAY DEVICE

(71) Applicant: Panasonic Intellectual Property Management Co., Ltd., Osaka (JP)

(72) Inventors: Makoto Maeda, Nara (JP); Sosuke Otani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 260 days.

(21) Appl. No.: 17/575,132

(22) Filed: Jan. 13, 2022

(65) Prior Publication Data
US 2022/0141432 A1    May 5, 2022

Related U.S. Application Data

(63) Continuation of application No. PCT/JP2020/026123, filed on Jul. 3, 2020.

(30) Foreign Application Priority Data

Jul. 23, 2019  (JP) .................................. 2019-135247

(51) Int. Cl.
G03B 21/20 (2006.01)
H04N 9/31 (2006.01)

(52) U.S. Cl.
CPC ......... *H04N 9/3152* (2013.01); *H04N 9/3158* (2013.01); *H04N 9/3164* (2013.01)

(58) Field of Classification Search
CPC ............ G03B 21/2046; H04N 9/3155; H04N 9/3158; H04N 9/315; H04N 9/3164
See application file for complete search history.

(56) References Cited

U.S. PATENT DOCUMENTS

| | | |
|---|---|---|
| 2008/0036977 A1 | 2/2008 | Sugita et al. |
| 2015/0124431 A1 | 5/2015 | Motoya et al. |
| 2016/0286183 A1 | 9/2016 | Haraguchi et al. |

FOREIGN PATENT DOCUMENTS

| | | |
|---|---|---|
| JP | 2006-162832 | 6/2006 |
| JP | 2007-206308 | 8/2007 |

(Continued)

OTHER PUBLICATIONS

International Search Report issued Sep. 1, 2020 in corresponding International Application No. PCT/JP2020/026123.

*Primary Examiner* — Ryan D Howard
(74) *Attorney, Agent, or Firm* — Wenderoth, Lind & Ponack, L.L.P.

(57) ABSTRACT

This projection display device includes: a light source unit emitting a white light along a first optical axis; a lighting unit provided on a second optical axis, the lighting unit splitting the white light into predetermined color lights and uniformizing an illuminance distribution of the predetermined color lights; an image generator including a display element modulating the predetermined color lights, and a projection lens projecting an image light including the predetermined color lights modulated along a third optical axis; at least one optical path switching unit selectively switching between reflection and transmission of the white light; a light diffuser including a diffusion optical system spreading the white light to a desired illumination area and projecting the spread white light as an illumination light; and a controller causing the at least one optical path switching unit to switch between emission of the image light and emission of the illumination light.

14 Claims, 14 Drawing Sheets

(56) References Cited

FOREIGN PATENT DOCUMENTS

| | | |
|---|---|---|
| JP | 4256423 | 4/2009 |
| JP | 2015-90403 | 5/2015 |
| JP | 2016-161798 | 9/2016 |
| JP | 2016-180979 | 10/2016 |
| JP | 2016-184067 | 10/2016 |
| WO | 2005/083508 | 9/2005 |

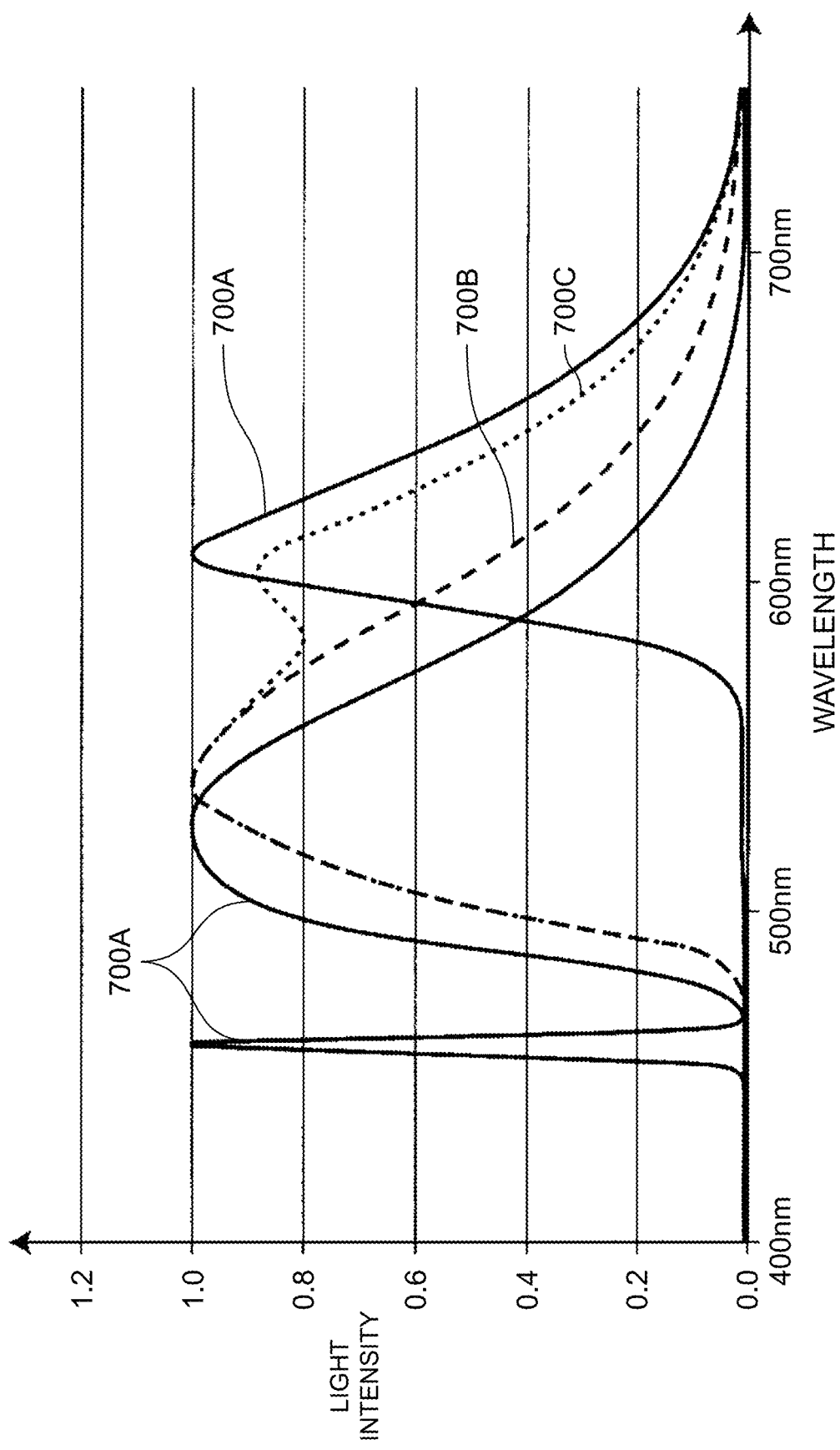

PROJECTION DISPLAY DEVICE

BACKGROUND

1. Technical Field

The present disclosure relates to a projection display device.

2. Description of the Related Art

For example, with technological innovation of solid-state light emitters such as semiconductor lasers and light emitting diodes (LEDs), the shift toward light sources based on semiconductor technologies such as LEDs or semiconductor lasers from light sources based on conventional lamp technologies is under way in the fields of image display and illumination. Conventional problems such as an inability to be instantly lighted and a short light source life have been solved, and it has been proposed to use such solid state light sources also in a light source for a projector that projects an image. In addition, such solid state light sources have been applied to a new use such as a projector that is also used for illumination.

For example, Patent Literature (PTL) 1 proposes, in a projector using a blue laser light source, which serves as an excitation light source and includes a semiconductor laser, and a phosphor wheel obtained by applying a phosphor on a rotating substrate to obtain a white light source, a feature of switching the phosphor wheel according to purposes in order to obtain wavelength spectra of both image light and illumination light by one projector.

Further, PTL 2 proposes, in a projector, switching an illumination optical system in order to achieve both an illumination distribution required for image light and an illumination distribution required for illumination light by one projector.

PTL 1 is Unexamined Japanese Patent Publication No. 2015-090403.
PTL 2 is Unexamined Japanese Patent Publication No. 2016-184067.

SUMMARY

Image light for displaying content and illumination light for illuminating an object are different in required light quality. For example, image light is required to have a uniform illuminance distribution without luminance unevenness in an image plane, and to allow the chromaticity coordinates of each of three primary colors representing an image to satisfy a desired value (color purity). On the other hand, the illumination light is required to have a gentle illuminance change from the center toward the outer edge in an illumination area, and to have high color rendering properties with a relatively broad spectrum in a visible light range such that the color of an object to be illuminated can be exactly represented.

It has been proposed that projectors according to the related art are used for both image display and illumination. However, such projectors are optically designed mainly for image display, and an illuminance distribution is converted into the one like the illuminance distribution of illumination light by representing a tone as an image. Therefore, such projectors have a problem that color rendering properties are limited to those that can be represented by image light.

In order to solve the above problem, PTL 1 discloses a method for improving color rendering properties when the projector is used for illumination by providing a plurality of phosphor wheels that is different in emission spectra between image light and illumination light, by changing fluorescence emission spectrum by switching an optical path of excitation light, and by projecting the resultant light. In addition, PTL 2 discloses a method for changing an illuminance distribution by inserting and removing an optical element for changing the distribution of the illumination light when the projector is used for illumination.

However, in the disclosed methods, only one of the color rendering properties and the illuminance distribution required for illumination can be improved, and it is necessary to separately provide an element for improvement, which leads to a problem of an increase in size of the device.

In view of the above problems, an object of the present disclosure is to provide a projection display device which is more compact than devices according to the related art, and which can achieve both color rendering properties and illuminance distribution required for both image light and illumination light.

A projection display device according to a first aspect of the present disclosure includes: a light source unit that generates and emits a white light along a first optical axis; a lighting unit provided on a second optical axis, the lighting unit splitting the white light into predetermined color lights and uniformizing an illuminance distribution of the predetermined color lights; an image generator including a display element that modulates the predetermined color lights uniformized by the lighting unit, according to an image signal, and a projection lens that emits and projects an image light including the predetermined color light modulated along a third optical axis; at least one optical path switching unit that selectively switches between reflection and transmission of the white light; a light diffuser including a diffusion optical system that spreads the white light to a desired illumination area and projects the spread white light as an illumination light; and a controller that causes the at least one optical path switching unit to switch between emission of the image light and emission of the illumination light.

A projection display device according to a second aspect of the present disclosure includes: a light source unit that generates and emits a white light along a first optical axis; a lighting unit provided on a second optical axis, the lighting unit splitting the white light into predetermined color lights and uniformizing an illuminance distribution of the predetermined color lights; and an image generator including a display element that modulates the predetermined color lights uniformized by the lighting unit, according to an image signal, and a projection lens that emits and projects an image light including the predetermined color light modulated along a third optical axis. The first optical axis, the second optical axis, and the third optical axis are substantially parallel to each other, and a direction of light travel on the first optical axis and the third optical axis is opposite to a direction of light travel on the second optical axis.

Therefore, according to the configuration of the present disclosure, it is possible to obtain a projection display device capable of achieving both wavelength spectra and illuminance distributions required for the image light and the illumination light with a configuration more compact than configurations according to the related art.

BRIEF DESCRIPTION OF DRAWINGS

FIG. 7 is a spectrum diagram illustrating an example of wavelength spectra of image light and illumination light.

DETAILED DESCRIPTION

Figure 1:
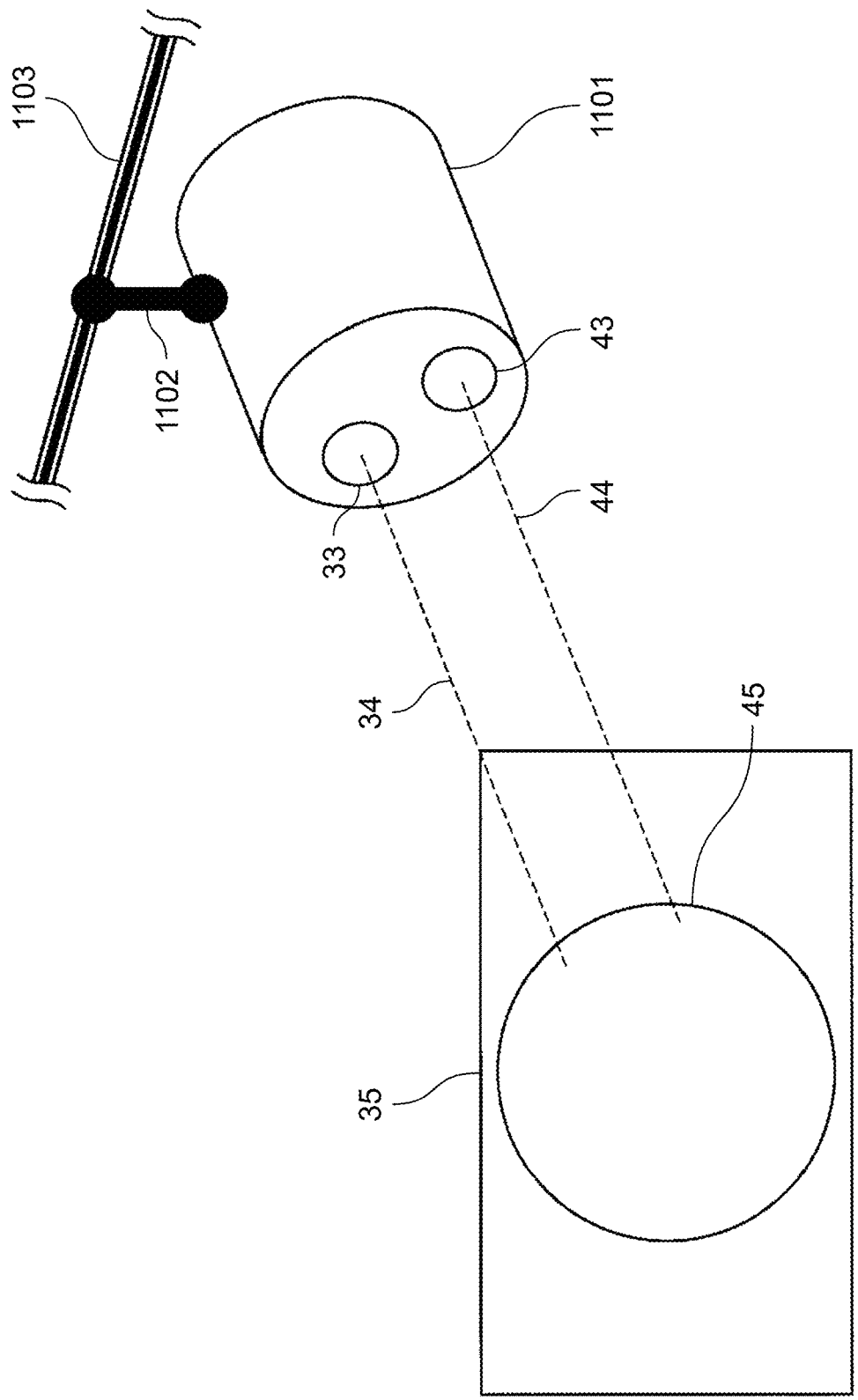
FIG. 1 is a perspective view illustrating an example of an outer appearance of a projection display device according to a first exemplary embodiment.

Exemplary embodiments will be described in detail below with reference to the drawings as appropriate. However, detailed description more than necessary may be sometimes omitted. For example, detailed descriptions of already known matters and duplicated descriptions of substantially identical configurations may be omitted. This is to avoid the following description from being unnecessarily redundant and thus to help those skilled in the art to easily understand the description. Note that the attached drawings and the following description are provided for those skilled in the art to fully understand the present disclosure, and are not intended to limit the subject matter described in the appended claims.

In the following description of the drawings of the projection display device according to the exemplary embodiments of the present disclosure, the same or similar portions are denoted by the same or similar reference marks. In addition, it should be noted that the drawings are schematic, and ratios of dimensions and the like are different from actual ones. Therefore, specific dimensions, etc. should be understood in view of the following description. In addition, in the drawings, dimensional relationships and ratios may differ from one another.

First Exemplary Embodiment

A projection display device according to a first exemplary embodiment will be described below with reference to the drawings.

(Overview of Projection Display Device)

FIG. 1 is a perspective view illustrating an example of an outer appearance of projection display device 100 according to the first exemplary embodiment.

In FIG. 1, projection display device 100 is constructed by connecting exterior housing 1101 to light rail 1103 via joint portion 1102. Exterior housing 1101 includes projection lens 33 that emits image light onto optical axis 34 as a light emission port and illumination lens 43 that emits illumination light onto optical axis 44. Projection lens 33 and illumination lens 43 are disposed in substantially the same plane on the light emission surface side of exterior housing 1101 such that optical axis 34 of the image light and optical axis 44 of the illumination light are substantially parallel to each other.

The image light from projection lens 33 is displayed in image display area 35 of the image light on a predetermined screen (or object), and the illumination light from illumination lens 43 illuminates the screen in illumination area 45 of the illumination light. Here, image display area 35 of the image light and illumination area 45 of the illumination light are illuminated while at least partially overlapping each other. In the present exemplary embodiment, image display area 35 is wider than illumination area 45, and illumination area 45 is included in image display area 35.

Figure 2:
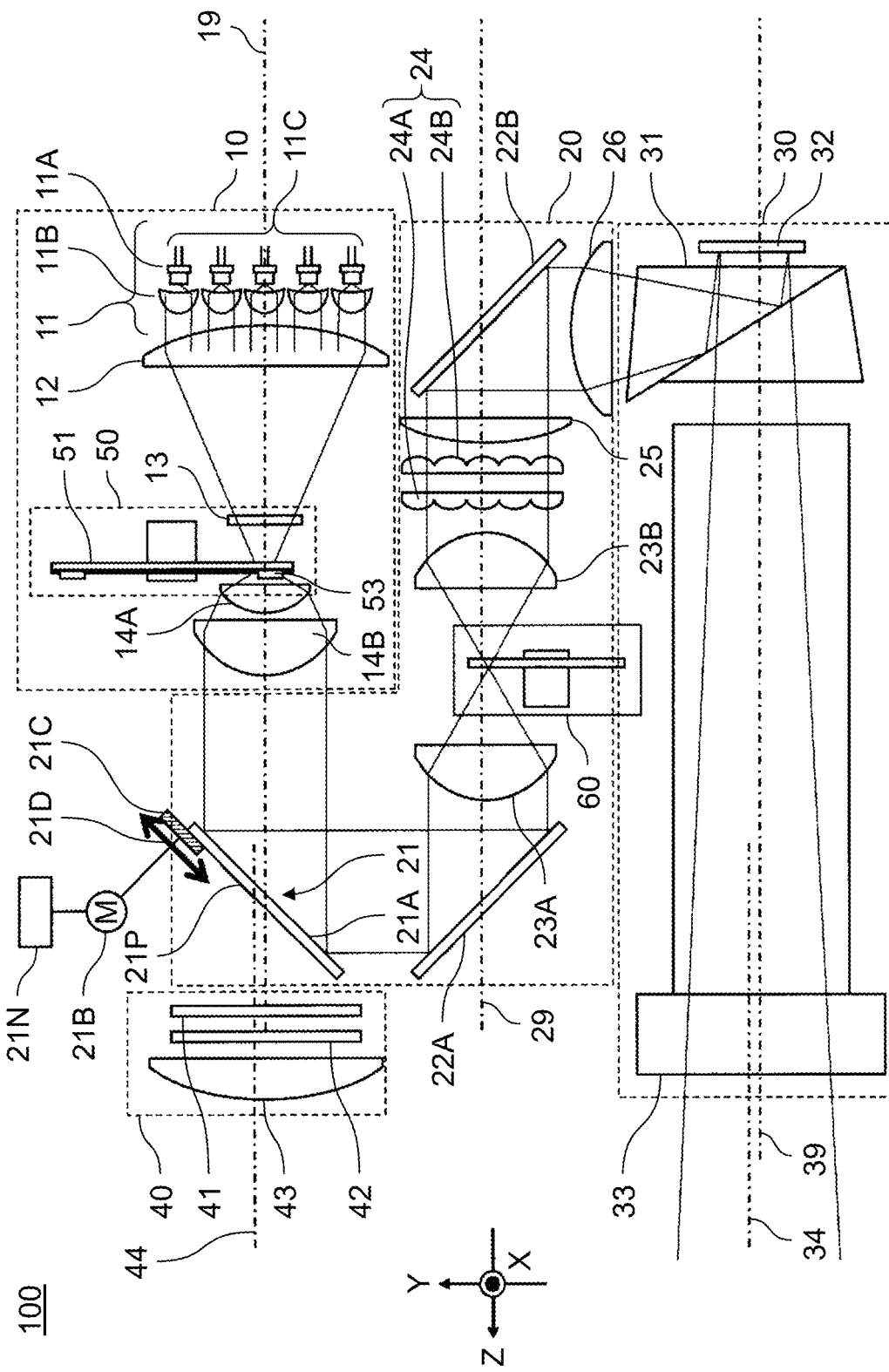
FIG. 2 is a plan view illustrating an internal configuration of the projection display device in FIG. 1 when image light is used.

FIG. 2 is a plan view illustrating an internal configuration of projection display device 100 in FIG. 1 when the image light is used. The internal configuration of projection display device 100 will be described with reference to FIG. 2.

In FIG. 2, projection display device 100 includes: light source unit 10 that generates white light; lighting unit 20 that splits the white light emitted from light source unit 10 into predetermined color light and uniformizes an illuminance distribution; and image generator 30 that modulates the color light from lighting unit 20 according to an image signal and enlarges and projects the image light onto the screen (or the object). Projection display device 100 is a projection display device equipped with one spatial modulation element 32 (for example, a digital mirror device (DMD)) that modulates illumination light according to an image signal.

(Configuration of Light Source Unit)

Light source unit 10 includes light source 11. Light source 11 includes semiconductor laser 11A as a laser light source and collimator lens 11B. Here, semiconductor laser 11A is an example of a solid-state light source.

Semiconductor laser 11A emits a blue laser light (having, for example, a wavelength of 455 nm) having the highest light emission efficiency among the three primary colors of RGB (R: red, G: green, B: blue). Semiconductor laser 11A is configured as array light source 11C in which a plurality of semiconductor lasers is arranged in a matrix in order to obtain high-output reference light. Although not illustrated, a heat sink for forced air cooling is provided on the back side of array light source 11C. Collimator lenses 11B disposed on the emission side of semiconductor lasers 11A condense the emitted light beams emitted from semiconductor lasers 11A into light beams substantially parallel to each other.

The blue laser light beams emitted from light source 11 are superimposed while being condensed by condenser lens 12, then pass through diffuser plate 13, and is applied to phosphor 53 on phosphor wheel 50 as excitation light. Diffuser plate 13 has a function of uniformizing a luminance distribution of light source 11 and reducing light coherence. Phosphor wheel 50 will be described later in detail.

From phosphor wheel 50, laser light passing through transparent substrate 51 and fluorescent light emitted from a phosphor irradiated with the laser light are obtained. That is, the blue laser light emitted from light source 11 is excitation light that generates a blue color image of image light and causes phosphor 53 to emit fluorescent light by phosphor wheel 50. Then, phosphor 53 emits fluorescent light having a wavelength band different from that of the excitation light by the excitation light incident from light source 11. The excitation light and the fluorescent light emitted from phosphor wheel 50 are substantially collimated by a collimator lens group including lens 14A and lens 14B, and emitted to optical axis 19 of light source unit 10.

Figure 4A:
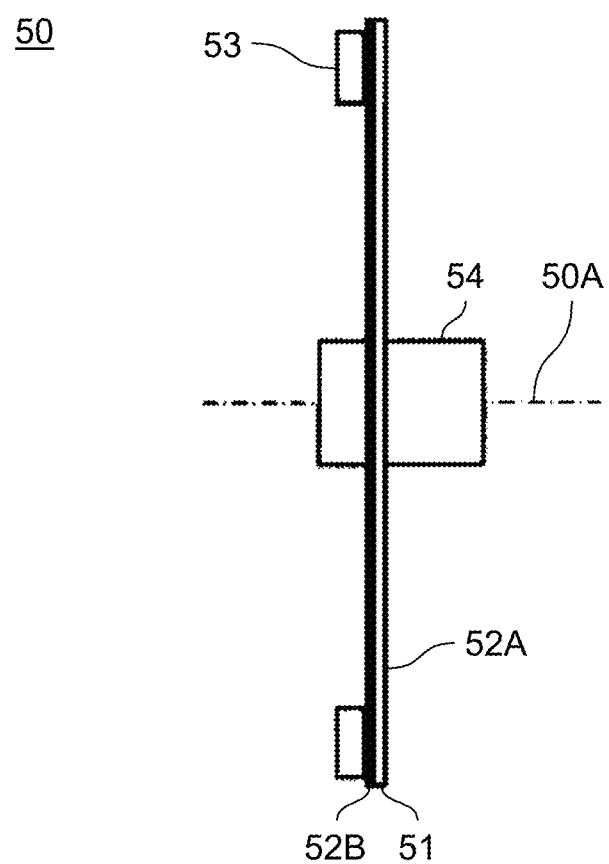
FIG. 4A is a side view illustrating a configuration example of a phosphor wheel in FIG. 2.
Figure 4B:
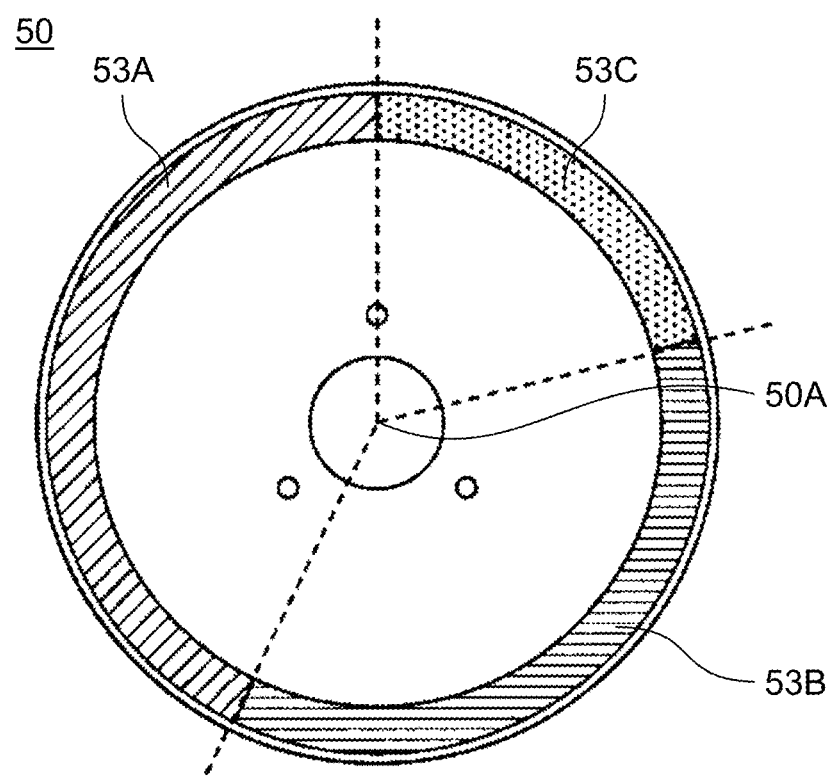
FIG. 4B is a front view illustrating the configuration example of the phosphor wheel in FIG. 4A.

FIG. 4A is a side view illustrating a configuration example of phosphor wheel 50 in FIG. 2, and FIG. 4B is a front view illustrating the configuration example of phosphor wheel 50 in FIG. 4A. Here, the configuration of phosphor wheel 50 will be described below with reference to FIGS. 4A and 4B. That is, FIG. 4A is a side cross-sectional view of phosphor wheel 50 viewed in the +Y direction in FIG. 2, and FIG. 4B is a front view of phosphor wheel 50 viewed from the left side (+Z direction in FIG. 2) in FIG. 4A. As illustrated in FIG. 4A, phosphor wheel 50 includes transparent substrate 51, phosphor 53, and motor 54. Motor 54 rotationally drives disk-shaped transparent substrate 51 around rotation shaft 50A.

Transparent substrate 51 has a disk shape and is formed of, for example, a sapphire substrate having high thermal conductivity. Antireflection film 52A is provided on the light incident surface side (non-phosphor forming surface) of transparent substrate 51, and dichroic film 52B that transmits blue light as excitation light and reflects light in a wavelength region different from that of the excitation light is provided on the light emission surface (phosphor forming surface). In addition, as illustrated in FIG. 4B, phosphor region 53A, phosphor region 53B, and transmission region 53C are annularly provided on the surface of dichroic film 52B.

In phosphor region 53A, a phosphor that emits yellow light having a dominant wavelength of about 570 nm by excitation of blue light having a wavelength of about 455 nm is applied to a sectoral region that is a part of the annular shape around rotation shaft 50A of transparent substrate 51 with respect to transparent substrate 51. The yellow phosphor is, for example, $Y_3Al_5O_{12}:Ce^{3+}$.

In phosphor region 53B, a phosphor that emits green light having a dominant wavelength of about 550 nm by excitation of blue light having a wavelength of about 455 nm is applied to a sectoral region that is a part of the annular shape around rotation shaft 50A of transparent substrate 51 with respect to transparent substrate 51. The green phosphor is, for example, $Lu_3Al_5O_{12}:Ce^{3+}$.

Transmission region 53C is a region where the phosphor is not applied, and the excitation light is transmitted therethrough without changing the wavelength. Preferably, a transparent diffusing agent that diffuses transmitted light is applied to transmission region 53C. The diffusing agent is, for example, a powder of a metal oxide or a transparent resin.

The blue light that is the excitation light enters phosphor wheel 50 from the right side (−Z direction) in FIG. 4A, enters transparent substrate 51 through antireflection film 52A, passes through dichroic film 52B, and sequentially irradiates phosphor region 53A, phosphor region 53B, and transmission region 53C according to the rotation position of phosphor wheel 50. Therefore, light source unit 10 constitutes a white light source unit that emits yellow fluorescent light, green fluorescent light, and blue light as excitation light in a time division manner.

(Configuration of Lighting Unit)

As illustrated in FIG. 2, lighting unit 20 includes movable mirror 21 as an optical path switching unit, mirror 22A, lens 23A, color filter wheel 60, lens 23B, fly-eye integrator 24, superposition lens 25, mirror 22B, and condenser lens 26. The optical path of the white light substantially collimated by lens 14A and lens 14B is inverted by 180 degrees by movable mirror 21 serving as the optical path switching unit and mirror 22A, so that the white light is condensed on color filter wheel 60 by lens 23A provided on optical axis 29 of the lighting unit. The light trimmed to desired color light by color filter wheel 60 is collimated again by lens 23B, enters first fly-eye lens 24A and second fly-eye lens 24B constituting fly-eye integrator 24, and is emitted to DMD 32, which is a display element provided in image generator 30, through superposition lens 25, mirror 22B, and condenser lens 26 so that the illuminance distribution is uniform.

Figure 5A:
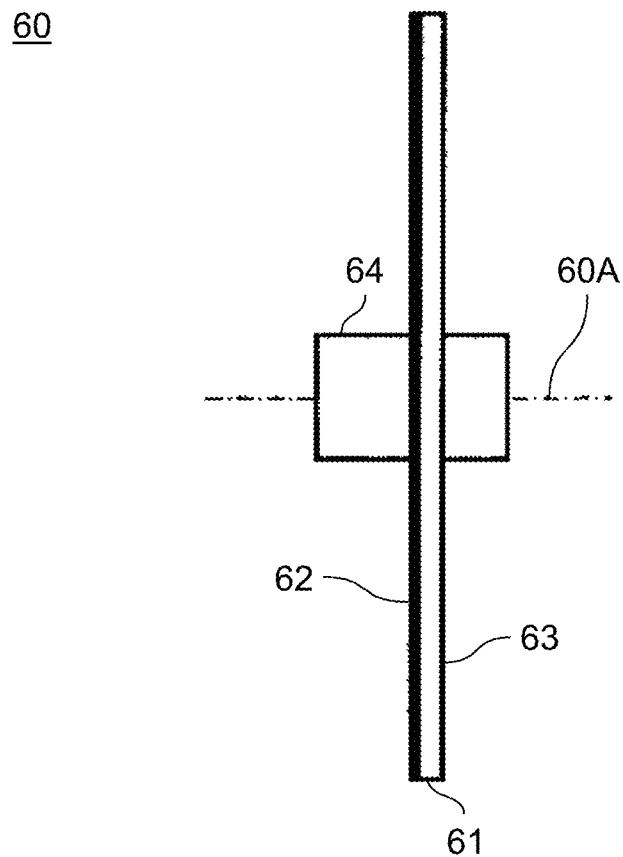
FIG. 5A is a side view illustrating a configuration example of a color filter wheel in FIG. 2.
Figure 5B:
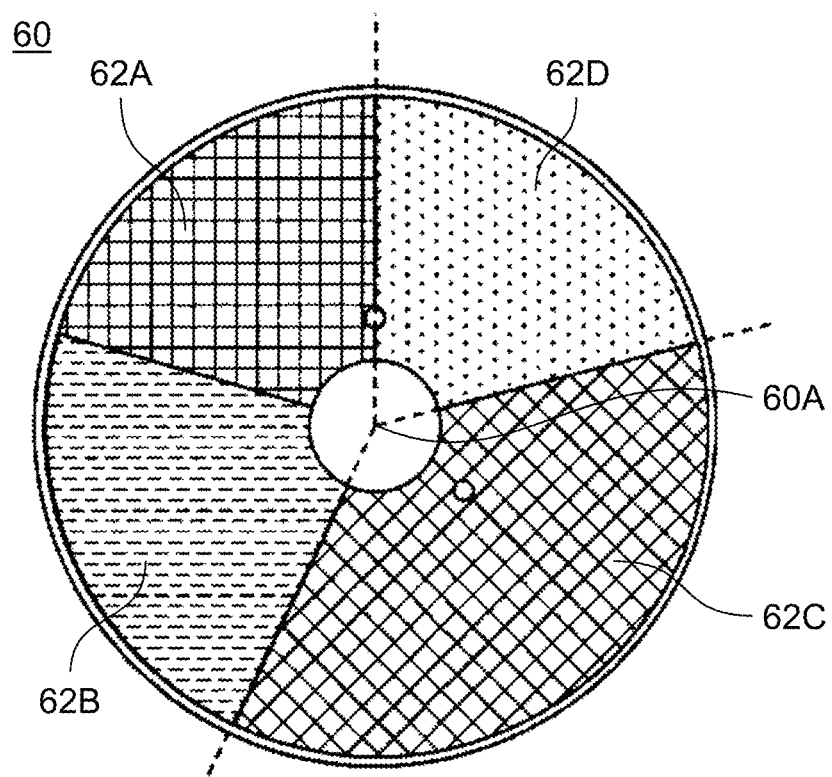
FIG. 5B is a front view illustrating the configuration example of the color filter wheel in FIG. 5A.

FIG. 5A is a side view illustrating a configuration example of color filter wheel 60 in FIG. 2, and FIG. 5B is a front view illustrating the configuration example of color filter wheel 60 in FIG. 5A. Color filter wheel 60 will now be described with reference to FIGS. 5A and 5B. Here, FIG. 5A is a side view of color filter wheel 60 viewed in the +Y direction in FIG. 2, and FIG. 5B is a front view of color filter wheel 60 viewed from the right side (+Z direction) in FIG. 5A.

As illustrated in FIG. 5A, color filter wheel 60 includes transparent substrate 61 and motor 64. Motor 64 rotationally drives disk-shaped transparent substrate 61 around rotation shaft 60A. Transparent substrate 61 is a disk-shaped transparent substrate, and is formed of, for example, a high transmission glass substrate over the entire visible region.

Dichroic film 62 that reflects a wavelength band of a part of incident light and transmits light in a desired wavelength region for obtaining desired color light is formed on the light incident surface of transparent substrate 61. Dichroic film 62 includes color filters 62A, 62B, and 62C. Antireflection film 63 is formed on the light emission surface of transparent substrate 61. Here, dichroic film 62 is an example of a reflective film in the color filter.

Color filter wheel 60 has four segments as illustrated in FIG. 5B. Color filter 62A as a first segment and color filter 62C as a third segment are composed of a color filter (dichroic film) having high transmission characteristics in a visible wavelength region longer than a wavelength of 480 nm and high reflection characteristics in a short visible wavelength region of a wavelength of 480 nm or less.

In addition, color filter 62B, which is a second segment, is composed of a color filter (dichroic film) having high transmission characteristics in a visible wavelength region longer than a wavelength of 600 nm and high reflection characteristics in a short visible wavelength region of a wavelength of 600 nm or less. Color filters 62A, 62B, and 62C perform trimming to reflect and cut light of a certain wavelength band of incident light and to transmit light in a desired wavelength region for obtaining desired color light.

Furthermore, light diffusion region 62D, which is a fourth segment, has a light diffusion function of diffusing incident light, and is, for example, a diffuser plate including a large number of microlens arrays on the surface of transparent substrate 61. Each segment is formed in a sector form around rotation shaft 60A of transparent substrate 61. Color filter wheel 60 has a configuration in which a plurality of types of color filters and a diffusion surface are locally and collectively formed on one transparent substrate, or an integrated configuration in which various filters each having a sector form and a diffuser plate are arranged and fixed. Here, phosphor wheel 50 and color filter wheel 60 are controlled to synchronously rotate at the same rotation speed. Here, color filters 62A, 62B, and 62C are examples of color filter plates that cut light in a certain wavelength region of light from phosphor wheel 50 and trim the light into desired color light.

The rotation control is adjusted such that the yellow fluorescent light emitted from phosphor region 53A in phosphor wheel 50 is incident on color filter 62A and color filter 62B in color filter wheel 60. Therefore, the angle of phosphor region 53A and the sum of the angles of color filter 62A and color filter 62B are set to be the same.

In a case where the yellow fluorescent light emitted from phosphor region 53A is transmitted through color filter 62A, color filter 62A reflects visible light having a short wavelength of 480 nm or less, and transmits visible light having a wavelength longer than 480 nm, thereby generating yellow light. In a case where the yellow fluorescent light emitted from phosphor region 53A is transmitted through color filter 62B, color filter 62B reflects visible light having a short wavelength of 600 nm or less, and transmits visible light having a wavelength longer than 600 nm, thereby generating red light.

The rotation control is adjusted such that the green fluorescent light emitted from phosphor region 53B in phosphor wheel 50 is incident on color filter 62C in color filter wheel 60. Therefore, the angle of phosphor region 53B and the angle of color filter 62C are set to be the same. In a case where the green fluorescent light emitted from phosphor region 53B is transmitted through color filter 62C, color filter 62C reflects visible light having a short wavelength of 480 nm or less, and transmits visible light having a wavelength longer than 480 nm, thereby generating green light.

Rotation control is adjusted such that excitation light transmitted through transmission region 53C in phosphor wheel 50 is incident on light diffusion region 62D in color filter wheel 60. Therefore, the angle of transmission region 53C and the angle of light diffusion region 62D are set to be the same. The excitation light transmitted through light diffusion region 52D is diffused in light diffusion region 62D to generate blue light.

(Configuration of Image Generator)

In FIG. 2, image generator 30 receives light emitted from lighting unit 20, and generates and displays an image. As illustrated in FIG. 2, image generator 30 includes total reflection prism 31, single DMD 32 that is a spatial modulation element, and projection lens 33 that enlarges and projects the image light modulated by the DMD to the screen or object (not illustrated) along optical axis 39 of the image generator.

(Overall Configuration of Projection Display Device)

In FIG. 2, projection display device 100 includes light source unit 10 that emits white light onto optical axis 19, lighting unit 20 provided in optical axis 29, image generator 30 that emits image light onto optical axis 39, and light diffuser 40 that emits illumination light onto optical axis 44. Optical axis 19, optical axis 29, and optical axis 39 are substantially parallel to each other. In addition, an optical path is bent such that, regarding the direction of light travel along each optical axis, optical axis 19 and optical axis 39 have the same vector, while optical axis 29 has an opposite vector. Here, optical axis 19 and optical axis 44 are substantially the same, and optical axis 39 and optical axis 34 are substantially the same.

Further, by providing movable mirror 21 serving as the optical path switching unit at a position of optical axis 19 where the vector is bent, optical axis 34 of the image light and optical axis 44 of the illumination light are substantially parallel to each other.

(Configuration of Optical Path Switching Unit)

Figure 3:
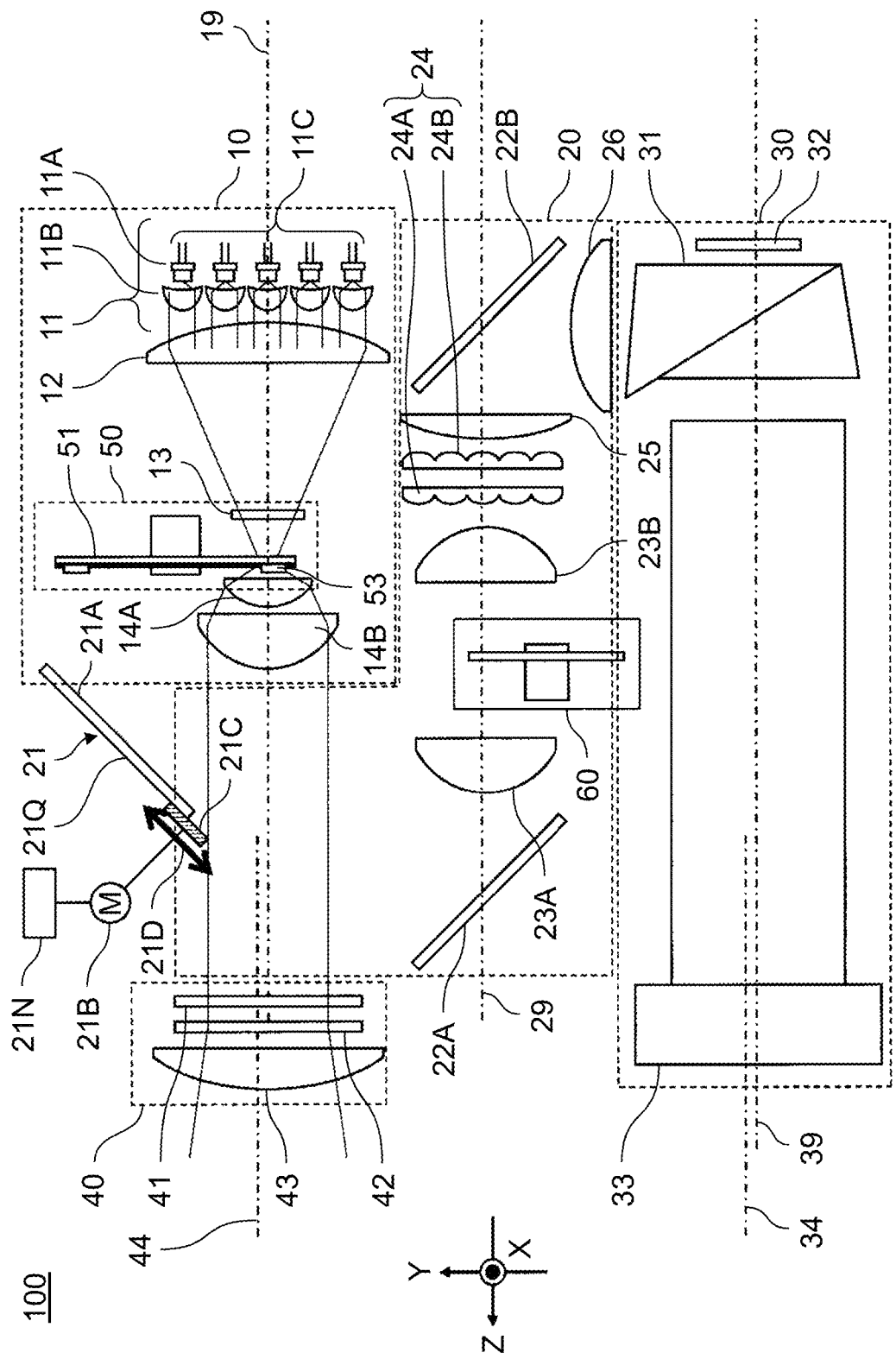
FIG. 3 is a plan view illustrating the internal configuration of the projection display device in FIG. 1 when illumination light is used.

FIG. 3 is a plan view illustrating the internal configuration of the projection display device in FIG. 1 when illumination light is used.

In FIGS. 2 and 3, movable mirror 21 that is the optical path switching unit includes: mirror 21A that reflects white light; motor 21B that slides and moves mirror 21A in sliding direction 21D between position 21P (FIG. 2) and position 21Q (FIG. 3); slide mechanism 21C; and control circuit 21N that controls operation of motor 21B of slide mechanism 21C.

The excitation light and the fluorescent light emitted from phosphor wheel 50 are substantially collimated by lens 14A and lens 14B, and enters movable mirror 21 provided on the emission side of lens 14B. When movable mirror 21 is disposed in front of lens 14B (position 21P), the excitation light and the fluorescent light are reflected by mirror 21A, and enlarged and projected as image light from projection lens 33 through image generator 30 as illustrated in FIG. 2.

When movable mirror 21 is not in front of lens 14B by driving of motor 21B (position 21Q), the excitation light and the fluorescent light travel straight, enter light diffuser 40, and are enlarged and emitted as illumination light by illumination lens 43 of light diffuser 40 as illustrated in FIG. 3.

(Configuration of Light Diffuser)

In FIG. 3, light diffuser 40 diffuses and collects the light emitted from lighting unit 20 and emits illumination light. Light diffuser 40 includes: diffusion element 42; and illumination lens 43 that emits illumination light having an illuminance distribution that has been adjusted by diffusion element 42 to the screen or the object (not illustrated).

Diffusion element 42 is, for example, a diffuser plate having a microlens array on a surface of glass, and adjusts an in-plane intensity distribution of white light constituted by excitation light and fluorescent light which have been emitted from phosphor wheel 50 and substantially collimated by lens 14A and lens 14B and which have a substantially Gaussian distribution.

Figure 6A:
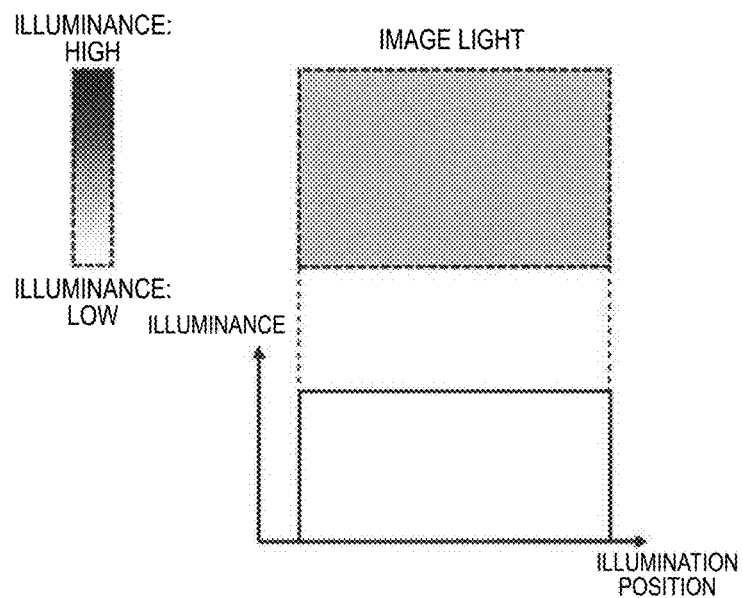
FIG. 6A is a graph illustrating an example of illuminance distribution of image light.
Figure 6B:
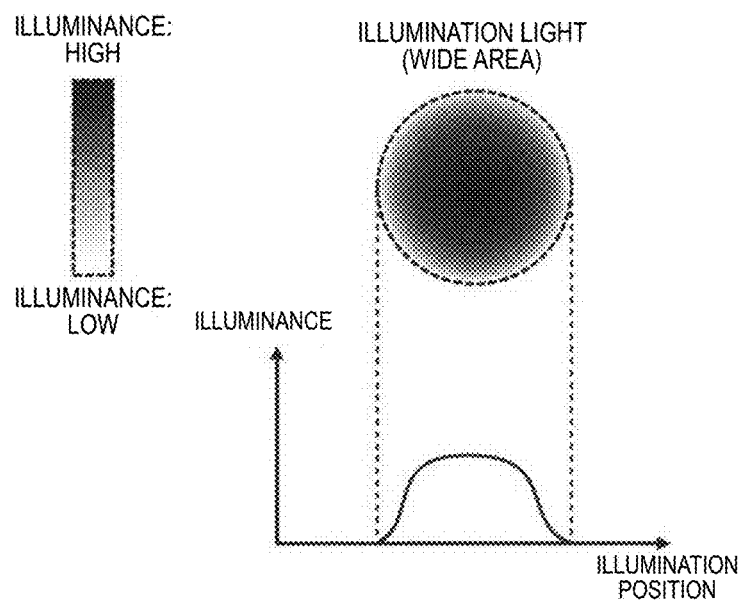
FIG. 6B is a graph illustrating an example of illuminance distribution of illumination light in a wide area.
Figure 6C:
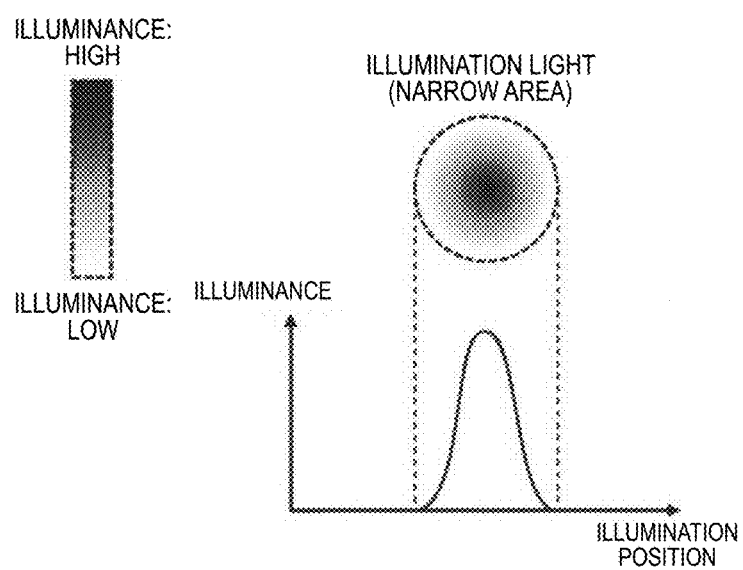
FIG. 6C is a graph illustrating an example of illuminance distribution of illumination light in a narrow area.

FIG. 6A is a graph illustrating an example of an illuminance distribution of image light, FIG. 6B is a graph illustrating an example of an illuminance distribution of illumination light in a wide area, and FIG. 6C is a graph illustrating an example of an illuminance distribution of illumination light in a narrow area.

For example, when a wide area with a predetermined value or more is illuminated, the intensity distribution of light is flattened by a diffuser plate having a large diffusion angle as illustrated in FIG. 6B. For example, when a narrow area with less than a predetermined value is illuminated, the intensity distribution of light at the center is increased by a diffuser plate having a small diffusion angle as illustrated in FIG. 6C. Note that the diffuser plate constituting diffusion element 42 is not limited to have one specification in advance. The diffuser plate may be configured to be replaceable by a user according to purposes, or diffuser plates of a plurality of specifications may be provided inside the housing, and they may be exchanged by being electrically inserted and removed. Preferably, high color rendering conversion optical element 41 for improving the color rendering properties of the illumination light is provided on the incident side of diffusion element 42.

High color rendering conversion optical element 41 is, for example, a fluorescent filter that emits color light for improving color rendering properties by excitation light, and includes an antireflection film on the light incident surface side and a fluorescent light emitting layer that emits fluorescent light on the long-wavelength side (orange to red light having a dominant wavelength of about 590 nm) with respect to a yellow phosphor by excitation light on the light emission surface side. As indicated by 700C in FIG. 7 to be described later showing a wavelength spectrum of illumination light having improved color rendering properties, a part of incident excitation light is converted into fluorescent light, whereby a wavelength spectral distribution is flattened, and color rendering properties are improved so as to be higher than those of incident light.

That is, high color rendering conversion optical element 41 is, for example, a dichroic filter that adjusts the transmittance in a specific wavelength band, and flattens the wavelength spectral distribution as indicated by 700C in FIG. 7 by reducing the transmittance on the short wavelength side including a blue band that is the excitation light, thereby increasing the color rendering properties to be higher than those of the incident light.

Note that high color rendering conversion optical element 41 is not limited to have one specification in advance. High color rendering conversion optical element 41 may be configured to be replaceable by a user according to purposes, or high color rendering conversion optical elements 41 of a plurality of specifications may be provided inside the housing, and they may be exchanged by being electrically inserted and removed.

(Illuminance Distribution and Wavelength Spectra of Image Light and Illumination Light)

Illuminance distributions and wavelength spectra of image light and illumination light will be described with reference to FIGS. 6A to 6C and 7.

FIGS. 6A to 6C are diagrams illustrating examples of illuminance distributions of image light and illumination light. FIG. 6A illustrates the illuminance distribution of the image light, and the illuminance distribution is substantially uniform in the plane of image display area 35. FIG. 6B illustrates the illuminance distribution of the illumination light in a case where a wide area is illuminated. This illuminance distribution shows that, in the plane of illumination area 45, the vicinity of the center is the brightest, and the illuminance gently changes from the center toward the circumference. FIG. 6C illustrates the illuminance distribution of the illumination light in a case where a narrow area is illuminated. This illuminance distribution shows that, in the plane of illumination area 45, the vicinity of the center is the brightest, and the illuminance sharply changes from the center toward the circumference.

FIG. 7 is a spectrum diagram illustrating an example of wavelength spectra of image light and illumination light. In FIG. 7, a wavelength spectrum of the image light is denoted by 700A. The image light has a wavelength spectrum in which each color light has an independent peak in order to keep high color purity of R, G, and B which are the three primary colors of the image, and cyan (Cy) light and yellow (Y) light between the respective colors (for example, dominant wavelength of R: 600 nm, dominant wavelength of G: 550 nm, and dominant wavelength of B: 455 nm) are cut without being used. A wavelength spectrum of the illumination light is denoted by 700B. In the present exemplary embodiment, the illumination light is white light entering movable mirror 21. Wavelength spectrum 700B is obtained by superimposing blue laser light as excitation light and yellow and green fluorescent light. Particularly, fluorescent components are continuous in wavelength spectrum 700B. A wavelength spectrum of the illumination light having improved color rendering properties is denoted by 700C. In the present exemplary embodiment, high color rendering conversion optical element 41 increases light on a longer wavelength side than yellow fluorescent light or cuts blue laser light to flatten the wavelength spectrum of illumination light.

(Generation of White Light)

In FIGS. 2 and 3, light source unit 10 generates white light by time-divisionally superimposing blue light as excitation light and yellow fluorescent light and green fluorescent light excited by phosphor wheel 50. Here, the superimposition period of the white light is controlled by synchronizing color filter wheel 60 with DMD 32, which is one spatial modulation element, so that the image light is emitted to DMD 32 in accordance with the modulation timings of image signals of R, G, and B in DMD 32, and the modulated image light is enlarged and projected by projection lens 33.

Here, when white light is used as illumination light, white light emitted from phosphor wheel 50 is directly used. Therefore, the superimposition period of the white light is determined only by phosphor wheel 50. Preferably, the superimposition period in the case where the white light is used as the illumination light is shorter (time division timings of blue light, yellow fluorescent light, and green fluorescent light are earlier) than the superimposition period in the case where the white light is used as the image light. This will be described below.

Figure 13A:
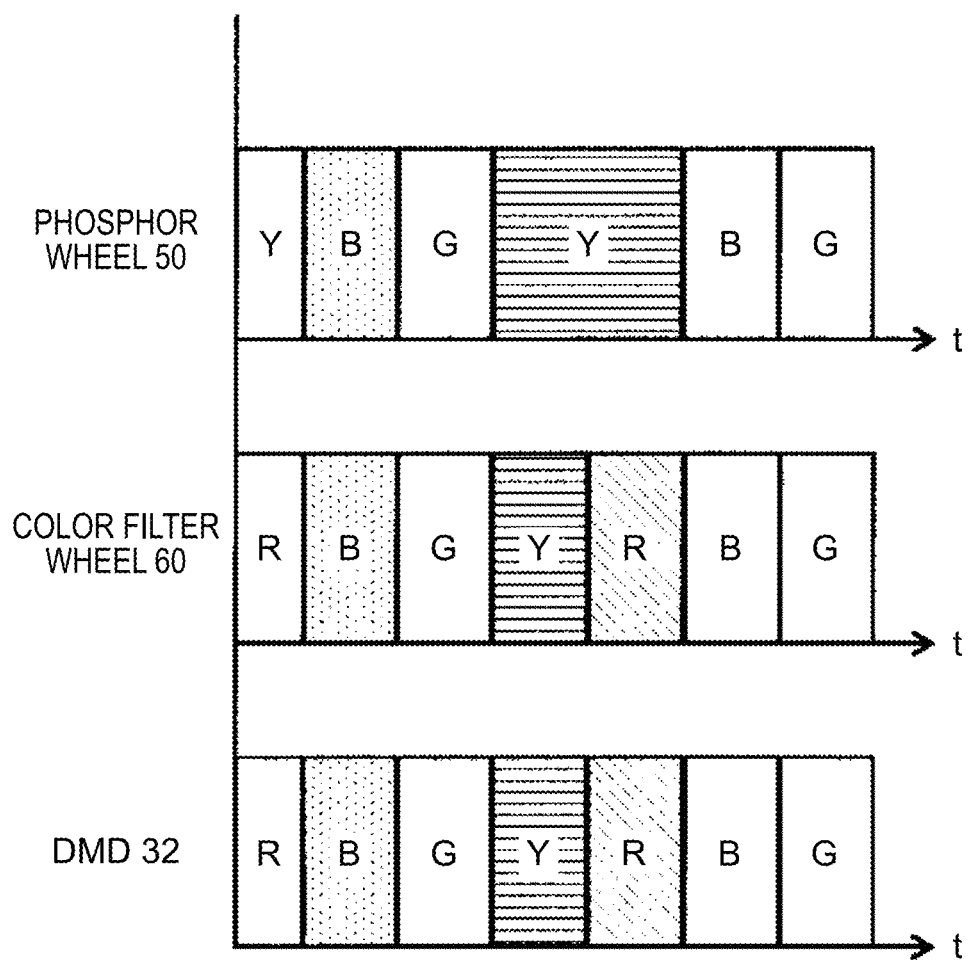
FIG. 13A is a timing chart illustrating an example of processing timings of the phosphor wheel, the color filter wheel, and a DMD for each color signal when image light is used in the projection display device in FIG. 2.
Figure 13B:
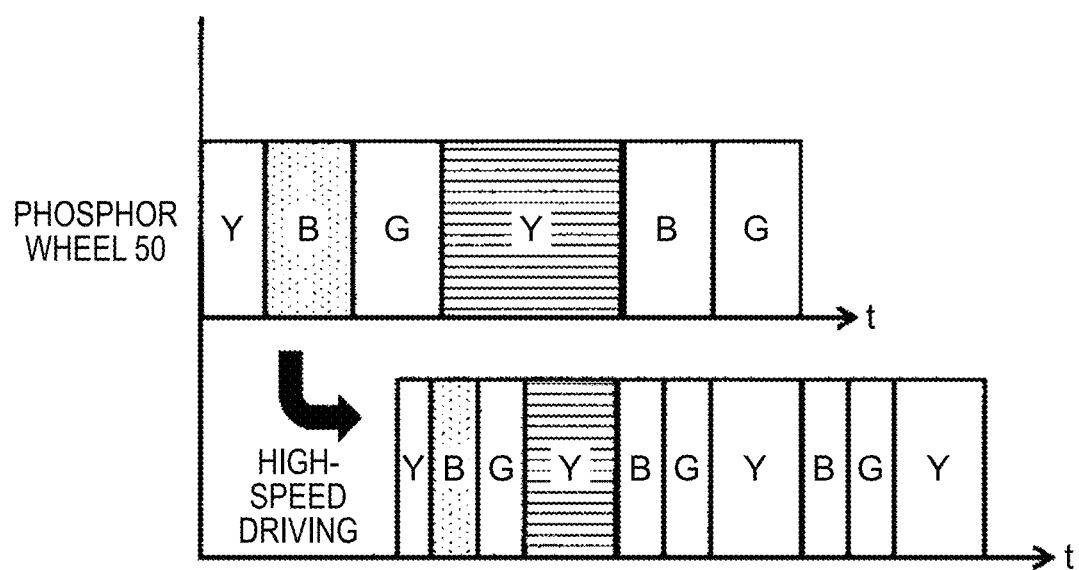
FIG. 13B is a timing chart illustrating an example of processing timings of the phosphor wheel and the like for each color signal when the illumination light is used in the projection display device according to the first exemplary embodiment.

FIG. 13A is a timing chart illustrating an example of processing timings of phosphor wheel 50, color filter wheel 60, and DMD 32 for each color signal when image light is used in the projection display device in FIG. 2. FIG. 13B is a timing chart illustrating an example of processing timings of phosphor wheel 50 and the like for each color signal when the illumination light is used in the projection display device according to the first exemplary embodiment.

When the white light is used as image light, phosphor wheel 50 and color filter wheel 60 are controlled to be driven in conjunction with each other in accordance with image display timing of DMD 32, as illustrated in FIG. 13A. As a result, color breakup of the time-division display determined by the display speed of DMD 32 can be seen.

When the white light is used as illumination light, only phosphor wheel 50 is used as an element related to the time-division lighting, and the timing of superimposition on white light is determined at the rotation speed of phosphor wheel 50, as illustrated in FIG. 13B. As a result, high-speed driving is possible, and color breakup can be avoided.

(Effects)

As described above, according to the present exemplary embodiment, optical axes of light source unit 10, lighting unit 20, and image generator 30 are disposed in parallel to each other, and an optical path is folded using mirrors, so that a footprint of an optical system can be minimized to achieve reduction in size. In addition, movable mirror 21, which is the optical path switching unit that switches between reflection and transmission, is provided in the reflection portion that changes the direction of light travel, and light diffuser 40 and the illumination lens are provided on the path of transmitted light. Thus, it is possible to obtain the projection display device that switches between projection of the image light and irradiation of the illumination light with a compact and simple configuration.

Furthermore, diffusion element 42 is provided in light diffuser 40, whereby it is possible to control the illuminance distribution in the illumination area without affecting the image light. In addition, high color rendering conversion optical element 41 is provided in light diffuser 40, whereby the wavelength spectral distribution of the illumination light can be controlled independently of the image light. Thus, the illumination light having high color rendering properties can be obtained.

In the projection display device according to the present exemplary embodiment, white light necessary for illumination is directly emitted from light source unit 10 of the projection display device, whereby it is possible to provide illumination light not affected by light loss due to lenses and color filters in lighting unit 20 for generating image light, and DMD 32 serving as a display element and projection lens 33 in image generator 30. Thus, high-efficiency and high-luminance illumination can be achieved.

In addition, the superimposition period of white light when illumination light is emitted is shortened, whereby it is possible to achieve illumination in which color breakup by time-division illumination is reduced.

Second Exemplary Embodiment

Figure 8:
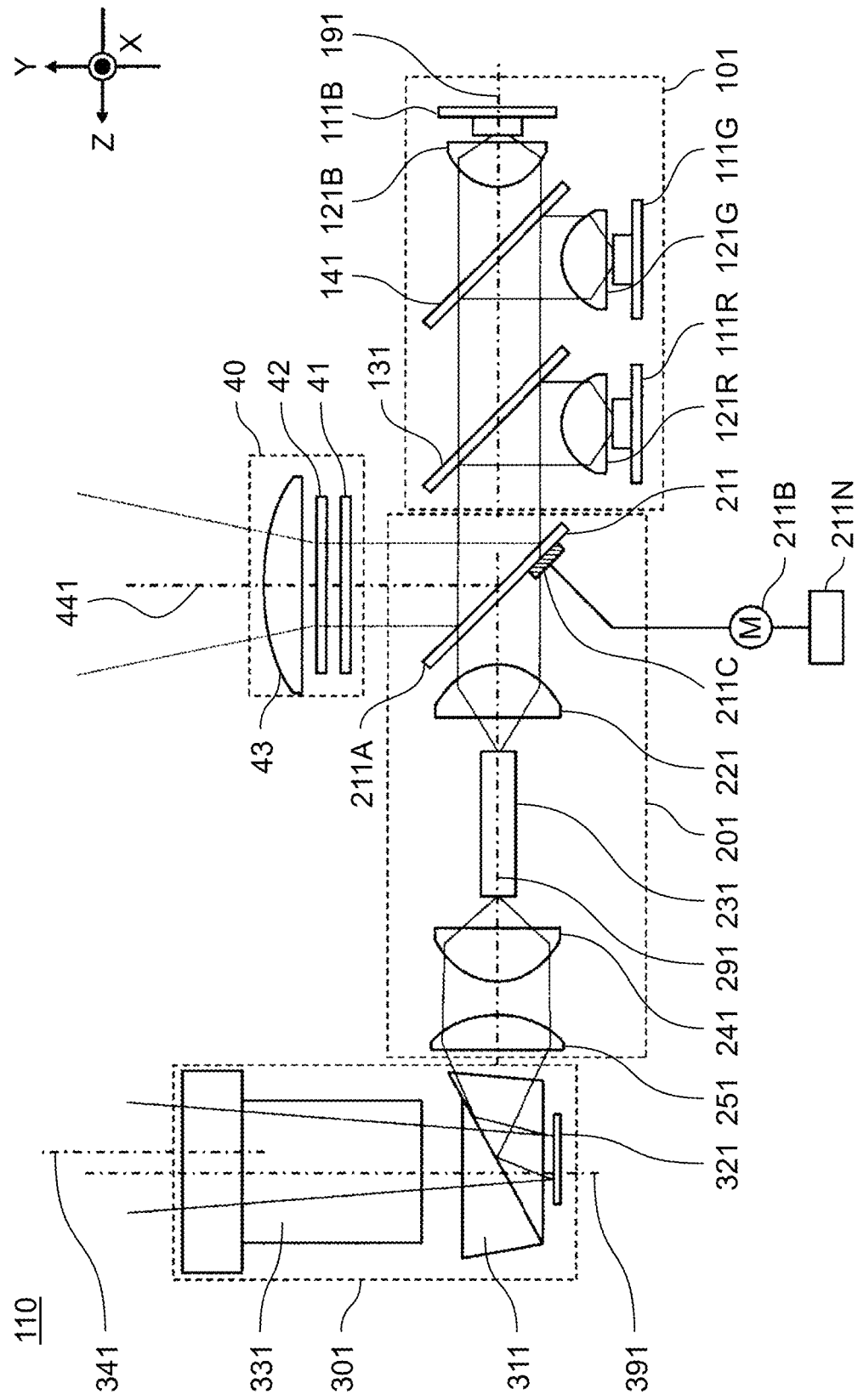
FIG. 8 is a plan view illustrating a configuration example of a projection display device according to a second exemplary embodiment.

FIG. 8 is a plan view illustrating a configuration example of projection display device 110 according to a second exemplary embodiment. In the following, the same components as those in FIG. 2 will be denoted by the same reference marks, and points of difference from the first exemplary embodiment will be mainly described.

The first exemplary embodiment describes an example in which an optical axis of a light source unit, an optical axis of a lighting unit, and an optical axis of an image generator are substantially parallel to each other, and a transmissive phosphor wheel using a transparent substrate is excited with excitation light emitted from a semiconductor laser light source to obtain fluorescent light. The second exemplary embodiment illustrated in FIG. 8 will describe an example of an LED light-source projector in which light emitting diodes (LEDs) of R, G, and B are used as light sources, an optical axis of a light source unit and an optical axis of a lighting unit are substantially parallel to each other, and an optical axis of an image generator is perpendicular to the optical axes.

(Configuration of Light Source Unit)

In FIG. 8, light source unit 101 includes: red LED 111R that emits red light; green LED 111G that emits green light; blue LED 111B that emits blue light; lens 121R, lens 121G, and lens 121B that substantially collimate light beams emitted from the LEDs; dichroic mirror 131 that reflects red light and transmits green light and blue light; and dichroic mirror 141 that reflects green light and transmits blue light.

Although not illustrated, a heat sink for forced air cooling is provided on the back side of red LED 111R, green LED 111G, and blue LED 111B, and each LED that generates image light is turned on in a time-division manner according to an image signal.

In FIG. 8, the blue light emitted from blue LED 111B is substantially collimated by lens 121B and passes through dichroic mirror 141. The green light emitted from green LED 111G is substantially collimated by lens 121G and reflected by dichroic mirror 141. As a result, the blue light and the green light are superimposed. The superimposed blue light and green light are transmitted through dichroic mirror 131. The red light emitted from red LED 111R is substantially collimated by lens 121R and reflected by dichroic mirror 131. As a result, the blue light, the green light, and the red light are superimposed and converted into substantially collimated white light, and the white light is emitted to optical axis 191 of light source unit 101.

(Configuration of Lighting Unit)

In FIG. 8, lighting unit 201 includes movable mirror 211 as an optical path switching unit, lens 221, rod integrator 231, lens 241, and condenser lens 251. The substantially collimated white light emitted from light source unit 101 is condensed by lens 221 and enters rod integrator 231 provided on optical axis 291 of the lighting unit. After being uniformized in illuminance distribution, the white light is substantially collimated by lens 241 provided on the emission side of rod integrator 231, and then emitted to DMD 321, which is a display element provided in image generator 301, through condenser lens 251 such that the illuminance distribution is uniform.

Movable mirror 211, which will be described in detail later, is provided on an incidence side of lens 221, and is disposed such that substantially collimated white light emitted from light source unit 101 is incident thereon.

(Configuration of Image Generator)

In FIG. 8, image generator 301 receives light emitted from lighting unit 201, and generates and displays an image. Image generator 301 includes total reflection prism 311, single DMD 321 that is a spatial modulation element, and projection lens 331 that enlarges and projects the image light modulated by the DMD to a screen or an object (not illustrated) along optical axis 391 of the image generator.

(Overall Configuration of Projection Display Device)

In FIG. 8, projection display device 110 includes light source unit 101 that emits white light onto optical axis 191, lighting unit 201 provided in optical axis 291, and image generator 301 that emits image light onto optical axis 391. Optical axis 191 and optical axis 291 are substantially parallel to each other, and an optical path is folded such that optical axis 391 is perpendicular to optical axis 291.

(Configuration of Optical Path Switching Unit)

In FIG. 8, movable mirror 211 that is the optical path switching unit includes: mirror 211A that reflects white light; motor 211B that flips up and moves a reflective surface of mirror 211A from a position perpendicular to the YZ plane in FIG. 8 to a position parallel to the YZ plane; flip-up mechanism 211C; and control circuit 211N that controls operation of motor 211B and flip-up mechanism 211C. Here, the substantially collimated red light, green light, and blue light emitted from light source unit 101 enters movable mirror 211.

When movable mirror 211 is flipped up and positioned to be parallel to the YZ plane, red light, green light, and blue light travel straight, enter lens 221, and are enlarged and projected as image light from projection lens 331 along optical axis 341 of the image light via lighting unit 201 and image generator 301. On the other hand, when movable mirror 211 is positioned to be perpendicular to the YZ plane, the red light, the green light, and the blue light are reflected by mirror 211A, then enter light diffuser 40, and are enlarged and emitted as the illumination light along optical axis 441 of the illumination light by illumination lens 43 of light diffuser 40.

As described above, by bending the white light emitted to optical axis 191 substantially perpendicularly by movable mirror 211 serving as the optical path switching unit, optical axis 341 of the image light and optical axis 441 of the illumination light are substantially parallel to each other.

(Generation of White Light)

In FIG. 8, light source unit 101 generates white light by superimposing red light emitted from red LED 111R, green light emitted from green LED 111G, and blue light emitted from blue LED 111B. In the present exemplary embodiment, in a case where image light is generated, red light, green light, and blue light are turned on in a time-division and color-sequential manner in accordance with timings of modulation of image signals of R, G, and B in DMD 321 which is one spatial modulation element.

Here, in a case where the white light is used as the illumination light, the time division lighting cycle of the white light is determined only by the lighting control of each color LED, and preferably, the lighting cycle in a case where the white light is used as the illumination light is shorter (time division timings of red light, green light, and blue light are earlier) than the lighting cycle in a case where the white light is used as the image light. This is similar to that described with reference to FIGS. 13A and 13B.

In addition, regarding the lighting order of the respective color LEDs, they may be simultaneously turned on instead of being turned on in a color sequential manner. Further, the respective color LEDs may be constantly turned on instead of being turned on in a color-sequential manner. Furthermore, the lighting pulse width of the each color LED may be changed according to the color temperature of the illumination light.

(Effects)

As described above, according to the present exemplary embodiment, movable mirror 211 that changes the traveling direction of the white light is provided in lighting unit 201, and illumination light is reflected in the direction in which the image light is projected, whereby it is possible to obtain a projection display device that switches between projection of the image light and emission of the illumination light with a simple configuration.

In addition, in a case where a light source capable of performing individual lighting control is used as the white light source, different lighting control for the light source is applied between the case where the white light is used as image light and the case where the white light is used as illumination light, whereby the quality of light such as color of the illumination light can be adjusted.

Third Exemplary Embodiment

Figure 9:
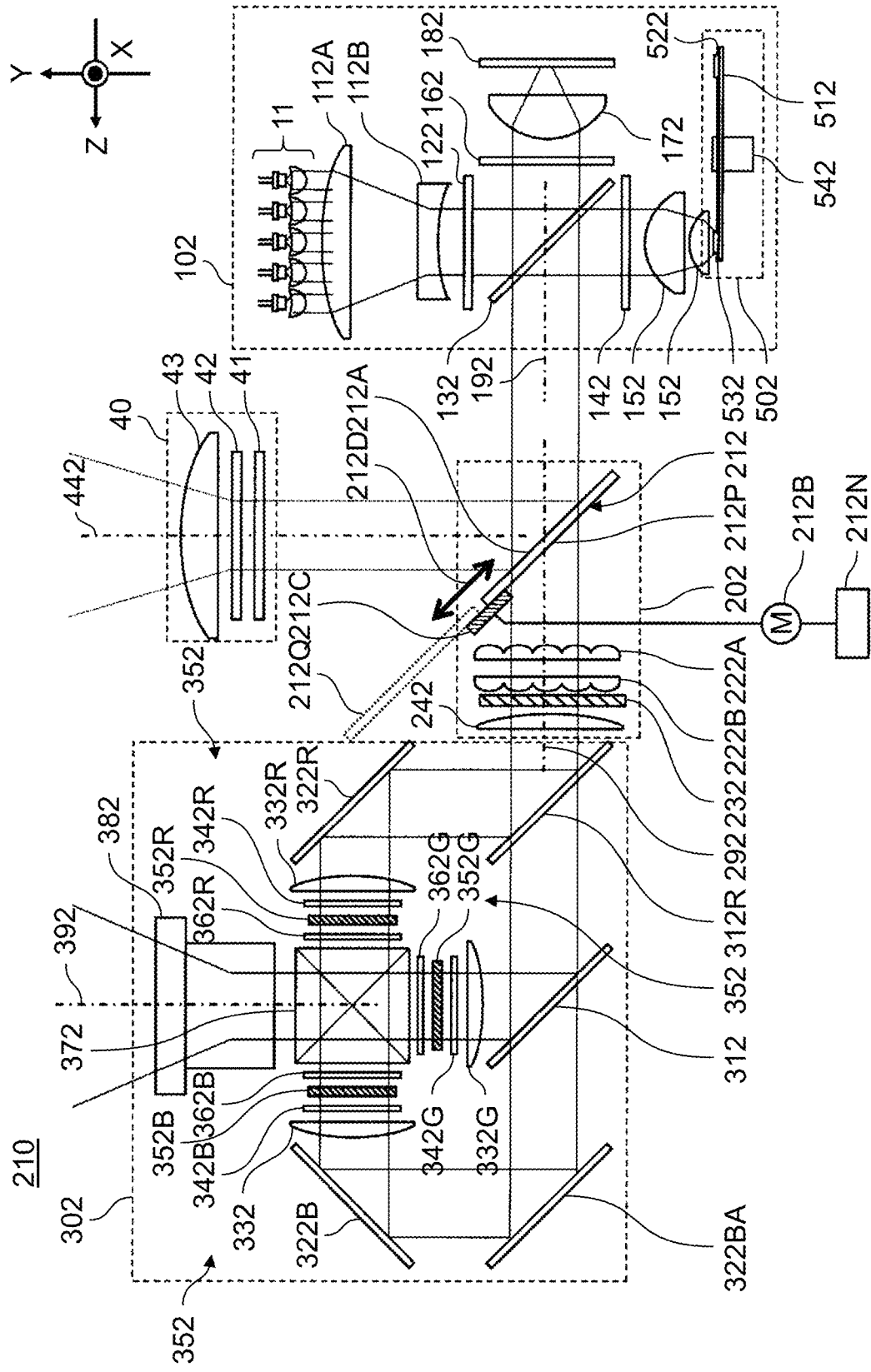
FIG. 9 is a plan view illustrating a configuration example of a projection display device according to a third exemplary embodiment.

FIG. 9 is a plan view illustrating a configuration example of projection display device 210 according to a third exemplary embodiment. In the following, the same components as those in FIG. 2 will be denoted by the same reference marks, and points of difference from the first exemplary embodiment will be mainly described.

The first exemplary embodiment describes an example in which single DMD 32 is used as a spatial modulation element, and describes a transmissive phosphor system in which transparent substrate 51 is used for phosphor wheel 50. On the other hand, the third exemplary embodiment illustrated in FIG. 9 will describe an example of a three panel liquid crystal projector using three spatial modulation elements LCD 352R, 352G, and 352B (hereinafter, they are collectively referred to as LCD 352) as display elements.

(Configuration of Light Source Unit)

In FIG. 9, light source unit 102 includes light source 11 including an array of blue semiconductor lasers, lenses 112A and 112B constituting an afocal optical system, wave plate 122, dichroic mirror 132, diffuser plate 142, lenses 152A and 152B constituting a collimator lens system, phosphor wheel 502, wave plate 162, condenser lens 172, and reflective diffuser plate 182.

Substantially collimated blue light beams emitted from light source 11 are superimposed by lenses 112A and 112B constituting the afocal optical system, while being reduced in light flux width, and enter wave plate 122 that is a half-wave plate. Wave plate 122 is an optical element that rotates polarization of the transmitted light, and adjusts the polarization ratio of P polarization and S polarization of the blue light that is emitted from light source 11 and that is linearly polarized light by the rotation angle of wave plate 122 around the optical axis.

The blue light split into a P polarization component by wave plate 122 is transmitted through dichroic mirror 132, condensed on phosphor wheel 502 through diffuser plate 142 and lens 152A and lens 152B which are collimator lens systems, and emitted. Here, dichroic mirror 132 is a color separation/synthesis mirror that transmits P-polarized blue light and reflects S-polarized blue light and yellow light having a longer wavelength than the blue light.

Phosphor wheel 502 is a reflective phosphor wheel including metal substrate 512, reflective layer 522, phosphor 532, and motor 542. Here, metal substrate 512 is a disk-shaped circular substrate, and is made of, for example, aluminum having high thermal conductivity. Reflective layer 522 is provided on the surface of metal substrate 512, and phosphor 532 is annularly provided on the surface of reflective layer 522.

Here, phosphor 532 is a yellow phosphor that emits yellow fluorescent light by blue light that is excitation light, and the yellow fluorescent light is emitted in all directions by the excitation light. Reflective layer 522 reflects incident light, reflects yellow fluorescent light emitted in all directions, and guides the yellow fluorescent light to the emission side of phosphor wheel 502. Reflective layer is, for example, a silver (Ag) reflective film deposited on aluminum or a white reflective film coated with titanium oxide ($TiO_2$) having a high diffusion reflectance.

Blue light that is excitation light enters phosphor wheel 502 and irradiates phosphor 532. The fluorescent light emitted from phosphor 532 is reflected by reflective layer 522, and is emitted in the incident direction of the blue light together with a component not incident on reflective layer 522. The fluorescent light emitted from phosphor wheel 502 is reflected by dichroic mirror 132.

The blue light split into the S-polarized component by wave plate 122 is reflected by dichroic mirror 132, transmitted through wave plate 162 which is a quarter wavelength plate, condensed on reflective diffuser plate 182 via condenser lens 172, and emitted. The blue light as the S-polarized component is diffused and reflected by reflective diffuser plate 182, is transmitted through wave plate 162 again to be turned into P-polarized light by 90-degree rotation of polarization, and is transmitted through dichroic mirror 132. The yellow fluorescent light reflected by dichroic mirror 132 and the blue light transmitted through dichroic mirror 132 are superimposed to be converted into white light, and are emitted to optical axis 192 of light source unit 102.

(Configuration of Lighting Unit)

In FIG. 9, lighting unit 202 includes movable mirror 212 as an optical path switching unit, fly-eye integrator 222, polarization conversion element 232, and superposition lens 242. The substantially collimated white light beams incident from light source unit 102 are aligned such that polarization directions are parallel to each other by first fly-eye lens 222A, second fly-eye lens 222B, and polarization conversion element 232 which constitute fly-eye integrator 222 arranged on optical axis 292 of the lighting unit, are uniformized in illuminance distribution by superposition lens 242, and are emitted to LCD 352 serving as a spatial modulation element in image generator 302.

Here, movable mirror 212 is provided on the incidence side of fly-eye integrator 222, and is disposed such that substantially collimated white light beams emitted from light source unit 102 are incident thereon.

(Configuration of Image Generator)

In FIG. 9, image generator 302 receives white light emitted from lighting unit 202, and generates and displays an image. White light emitted from superposition lens 242 of lighting unit 202 is separated into predetermined red light, green light, and blue light through dichroic mirror 312R that reflects and separates red light and dichroic mirror 312G that reflects and separates green light.

The red light reflected by dichroic mirror 312R is modulated into image light by red LCD 352R via mirror 322R, lens 332R, and incidence-side polarization plate 342R, and is guided to color combiner prism 372 via emission-side polarization plate 362R. The green light transmitted through dichroic mirror 312R and reflected by dichroic mirror 312G is modulated into image light by green LCD 352G via lens 332G and incidence-side polarization plate 342G, and is guided to color combiner prism 372 via emission-side polarization plate 362G. The blue light transmitted through dichroic mirrors 312R and 312G is modulated into image light by blue LCD 352B via mirror 322BA, mirror 322BB, lens 332B, and incidence-side polarization plate 342B, and is guided to color combiner prism 372 via emission-side polarization plate 362B.

Further, the red light, the green light, and the blue light modulated into the image light are combined by color combiner prism 372, and enlarged and projected onto a screen or an object (not illustrated) by projection lens 382 along optical axis 392 of the image generator.

(Overall Configuration of Projection Display Device)

In FIG. 9, projection display device 210 includes light source unit 102 that emits white light onto optical axis 192, lighting unit 202 provided on optical axis 292, and image generator 302 that emits image light onto optical axis 392. Optical axis 192 and optical axis 292 are substantially parallel to each other, and an optical path is folded such that optical axis 392 is perpendicular to optical axis 292.

(Configuration of Optical Path Switching Unit)

In FIG. 9, similar to movable mirror 21 in the first exemplary embodiment, movable mirror 212 that is the optical path switching unit slides mirror 212A that reflects white light in sliding direction 212D between positions 212P and 212Q by motor 212B and slide mechanism 212C under the control of control circuit 212N, thereby switching the optical path of the white light.

When movable mirror 212 is not located on optical axis 192 (position 212Q), the white light travels straight, enters fly-eye integrator 222, and is enlarged and projected as the image light along optical axis 392 of the image light by projection lens 382 through lighting unit 202 and image generator 302. On the other hand, when movable mirror 211 is located on optical axis 192 (position 212P), the white light is reflected by mirror 212A, enters light diffuser 40, and is enlarged and emitted as the illumination light along optical axis 442 of the illumination light by illumination lens 43 of light diffuser 40.

As described above, by bending the white light emitted to optical axis 192 substantially perpendicularly by movable mirror 212 serving as the optical path switching unit, optical axis 392 of the image light and optical axis 442 of the illumination light are substantially parallel to each other.

(Effects)

As described above, according to the present exemplary embodiment, movable mirror 212 that changes the traveling direction of the white light is provided in lighting unit 202, and illumination light is reflected in the direction in which the image light is projected, whereby it is possible to obtain a projection display device that switches between projection of the image light and emission of the illumination light with a simple configuration.

Fourth Exemplary Embodiment

Figure 10:
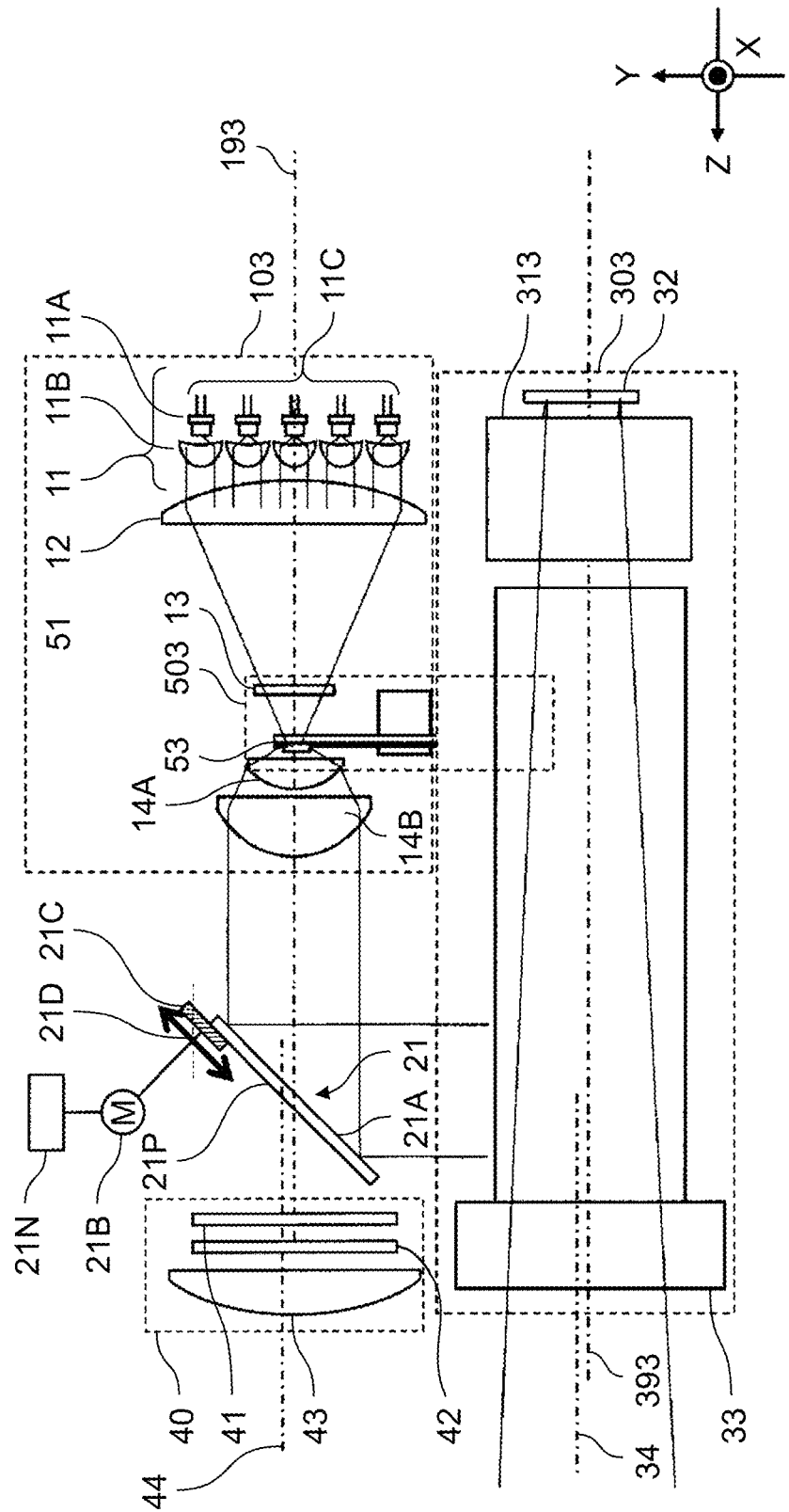
FIG. 10 is a plan view illustrating a configuration example of a projection display device according to a fourth exemplary embodiment.
Figure 11:
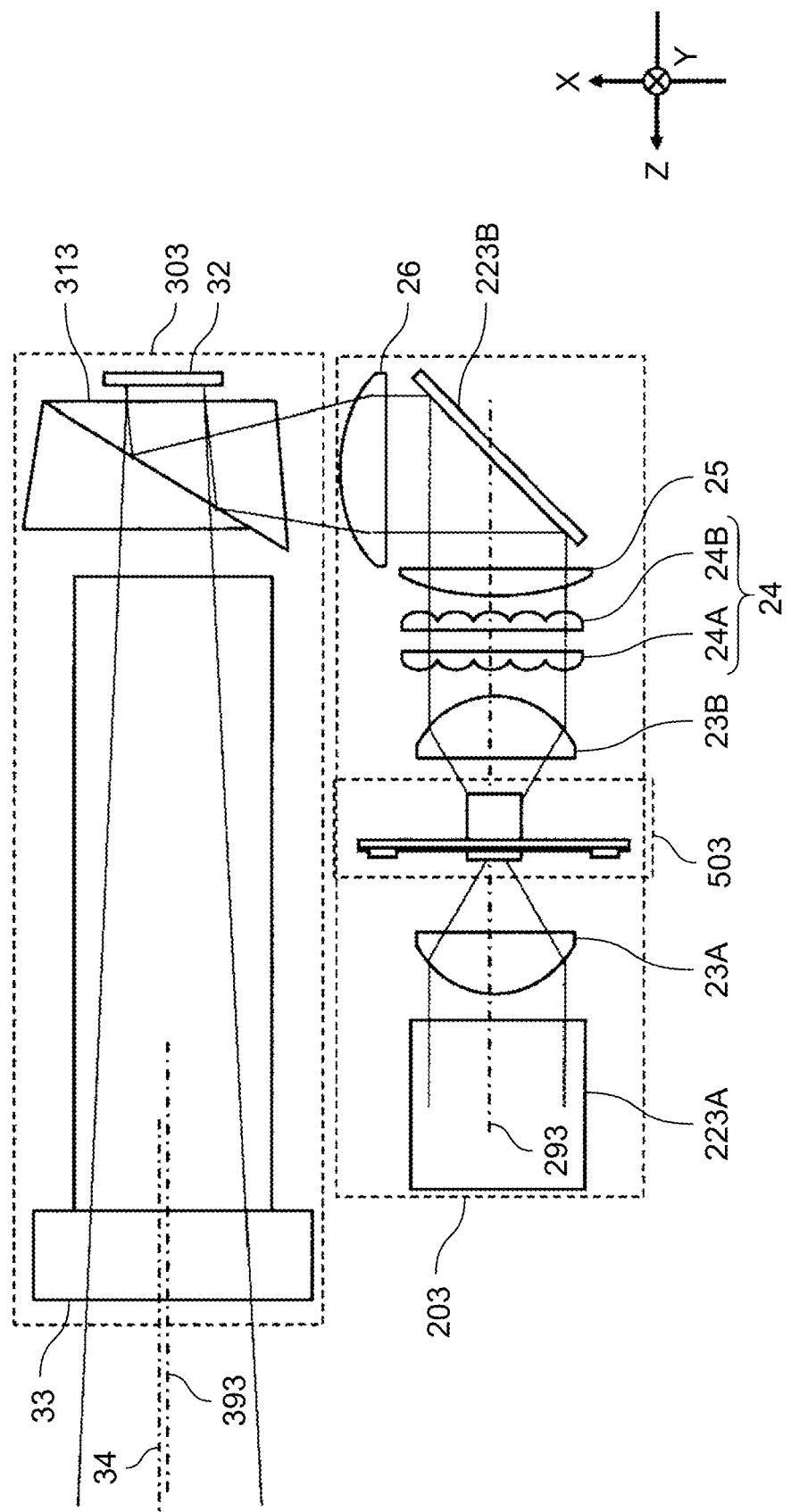
FIG. 11 is a side view illustrating the configuration example of the projection display device in FIG. 10.

FIG. 10 is a plan view illustrating a configuration example of projection display device 310 according to a fourth exemplary embodiment, and FIG. 11 is a side view illustrating the configuration example of projection display device 310 in FIG. 10. In the following, the same components as those in FIG. 2 will be denoted by the same reference marks, and points of difference from the first exemplary embodiment will be mainly described.

The first exemplary embodiment describes an example of a projection display device that is reduced in size by providing an optical system in the same plane. On the other hand, the fourth exemplary embodiment illustrated in FIGS. 10 and 11 will describe a configuration for achieving further downsizing by three-dimensionally providing three optical axes. Here, FIG. 10 is a plan view seen in the +X direction, and FIG. 11 is a side view seen in the −Y direction.

(Configuration of Projection Display Device)

In FIG. 10, projection display device 310 includes light source unit 103 that emits white light onto optical axis 193, lighting unit 203 provided on optical axis 293, image generator 303 that emits image light onto optical axis 393, and light diffuser 40 that emits illumination light onto optical axis 44. Here, optical axis 193 and optical axis 44 are substantially the same, and optical axis 393 and optical axis 34 are substantially the same. Further, movable mirror 21 serving as an optical path switching unit is provided at a position of optical axis 193 where a vector is bent, so that optical axis 34 of the image light and optical axis 44 of the illumination light are substantially parallel to each other.

Optical axis 193, optical axis 293, and optical axis 393 are substantially parallel to each other, and an optical path is folded such that the direction of light travel along optical axis 193 and the direction of light travel along optical axis 393 have the same vector, while the direction of light travel along optical axis 293 has an opposite vector. Further, the optical path is folded from optical axis 293 by mirror 223B and prism 313 such that optical axis 393 is not located on the plane formed by optical axis 193 and optical axis 293 but is parallel to the plane.

(Configurations of Light Source Unit and Lighting Unit)

In the first exemplary embodiment, phosphor wheel 50 is used as a fluorescent light emitting light source in light source unit 10, and color filter wheel 60 is used as a filter that generates desired color light in lighting unit 20. On the other hand, the present exemplary embodiment uses phosphor wheel 503 in which the function of phosphor wheel 50 and the function of color filter wheel 60 are integrated.

Figure 12A:
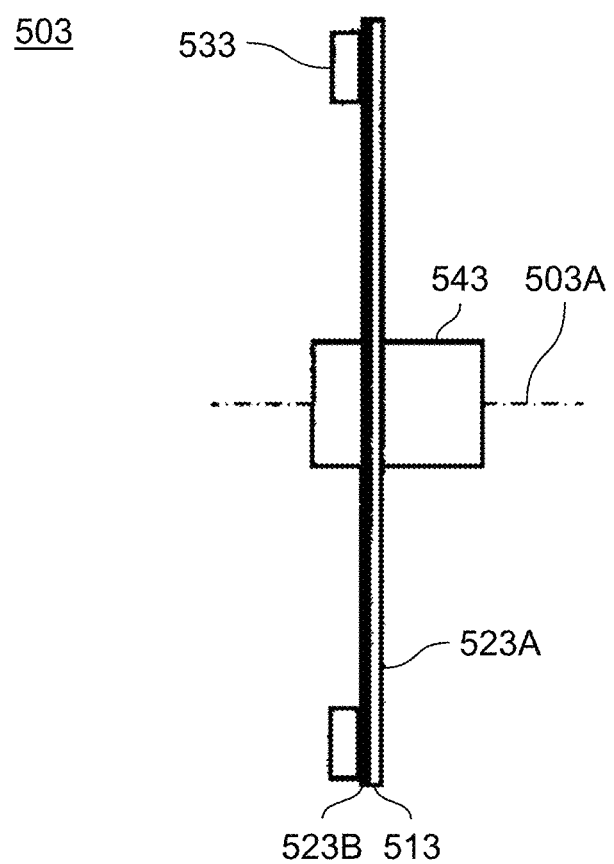
FIG. 12A is a side view illustrating a configuration example of a phosphor wheel in FIG. 10.

Phosphor wheel 503 will be described with reference to FIGS. 12A and 12B. FIG. 12A is a side cross-sectional view of phosphor wheel 503 as viewed in the −Y direction in FIG. 10, and FIG. 12B is a front view of phosphor wheel 503 as viewed from the left side (+Z direction in FIG. 10) in FIG. 12A.

Figure 12B:
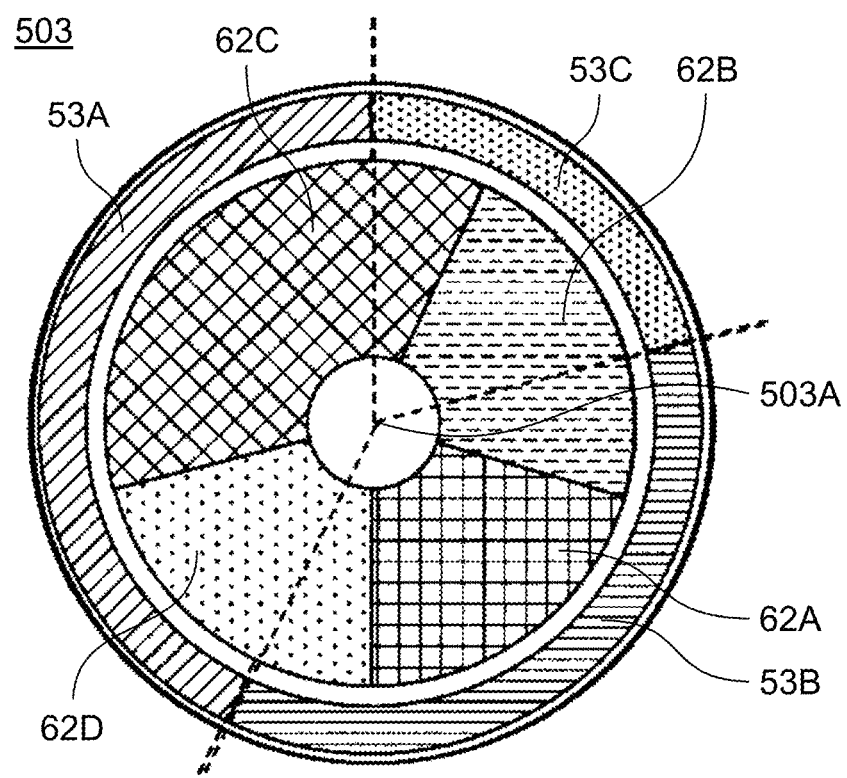
FIG. 12B is a front view illustrating the configuration example of the phosphor wheel in FIG. 10.

In FIGS. 12A and 12B, phosphor wheel 503 includes transparent substrate 513, phosphor 533, and motor 543. Phosphor wheel 503 is rotationally driven by motor 543 around rotation shaft 503A. Transparent substrate 513 includes antireflection film 523A on the side where light is incident on phosphor 533, and dichroic film 523B that transmits blue light as excitation light and reflects light of other wavelengths on the outer peripheral side of a light emission surface to which phosphor 533 is applied. In addition, in order to achieve a function same as the function of the color filter wheel, phosphor wheel 503 has, on an inner peripheral side thereof, color filters (dichroic films) 62A and 62C having characteristics of high transmission in a visible wavelength region longer than a wavelength of 480 nm and high reflection in a short visible wavelength region of a wavelength of 480 nm or less, color filter 62B having characteristics of high transmission in a visible wavelength region longer than a wavelength of 600 nm and high reflection in a short visible wavelength region of a wavelength of 600 nm or less, and light diffusion region 62D having a light diffusion function of diffusing incident light.

Phosphor wheel 503 uses phosphor 533 on the outer peripheral portion as a fluorescent light emitter in light source unit 103, and uses a color filter at a position inverted by about 180 degrees as a color trimming portion of lighting unit 203.

(Configuration of Optical Path Switching Unit)

In a case where movable mirror 21 as the optical path switching unit is located on optical axis 193 (position 21P), the white light emitted from light source unit 103 is reflected by mirrors 21A and 223A, travels along optical axis 293 of lighting unit 203, and is condensed on color filters 62A, 62B, and 62C and light diffusion region 62D on the inner peripheral side of phosphor wheel 503 by lens 23A. The white light is split into desired color light by color filters 62A, 62B, and 62C and light diffusion region 62D, passes through lens 23B, fly-eye integrator 24, and superposition lens 25, is reflected by mirror 223B, travels in the +X direction, and enters prism 313 of image generator 303 via condenser lens 26. The light incident on prism 313 is bent in the +Z direction, enters DMD 32, is modulated by DMD 32, travels along optical axis 393, and is enlarged and projected as image light by projection lens 33.

On the other hand, when movable mirror 21 is not located on optical axis 193 (position 21Q), the excitation light and the fluorescent light from light source unit 103 travel straight, enter light diffuser 40, and are enlarged and emitted as the illumination light by illumination lens 43 of light diffuser 40.

(Effects)

As described above, according to the present exemplary embodiment, optical axes of light source unit 103, lighting unit 203, and image generator 303 are disposed three-dimensionally and in parallel to each other, so that a footprint of an optical system can be minimized to achieve reduction in size of the housing of a projector.

In addition, light source unit 103 and lighting unit 203 are disposed in parallel to and adjacent to each other, whereby the function of phosphor emission and the function of trimming light into desired color light can be achieved only by phosphor wheel 503 to reduce a number of components. Thus, reduction in size and reduction in cost can be achieved.

The present disclosure is widely applicable to a projection display device that enlarges and projects an image.

What is claimed is:

1. A projection display device comprising:
   a light source unit that generates and emits a white light along a first optical axis;
   a lighting unit provided on a second optical axis, the lighting unit splitting the white light into predetermined color lights and uniformizing an illuminance distribution of the predetermined color lights;
   an image generator including a display element that modulates the predetermined color lights uniformized by the lighting unit, according to an image signal, and a projection lens that emits and projects an image light including the predetermined color lights modulated along a third optical axis;
   at least one optical path switching unit that selectively switches between reflection and transmission of the white light;
   a light diffuser including a diffusion optical system that spreads the white light to a desired illumination area and projects the spread white light as an illumination light; and
   a controller that causes the at least one optical path switching unit to switch between emission of the image light and emission of the illumination light, wherein
   the first optical axis and the third optical axis are substantially parallel to each other.

2. The projection display device according to claim 1, wherein an optical axis of the image light emitted from the image generator and an optical axis of the illumination light emitted from the light diffuser are substantially parallel to each other.

3. The projection display device according to claim 2, wherein an illumination area of the illumination light and an image display area of the image light at least partially overlap each other.

4. The projection display device according to claim 1, wherein the illumination light has a wavelength spectrum wider than a wavelength spectrum of the image light.

5. The projection display device according to claim 1, wherein the light diffuser includes a high color rendering conversion optical element that increases color rendering properties of the white light entering the light diffuser and outputs the white light.

6. The projection display device according to claim 1, wherein the white light emitted from the light source unit is a superimposed light obtained by superimposing the predetermined color lights in a time division manner, and a superimposition period when the illumination light is emitted is shorter than a superimposition period when the image light is emitted.

7. The projection display device according to claim 1, wherein the first optical axis, the second optical axis, and the third optical axis are substantially parallel to each other, and a direction of light travel along the first optical axis and the third optical axis is opposite to a direction of light travel along the second optical axis.

8. The projection display device according to claim 1, wherein emitting directions of light along the first optical axis and the second optical axis are perpendicular to each other.

9. A projection display device comprising:
A light source unit that generates and emits a white light along a first optical axis;
a lighting unit provided on a second optical axis, the lighting unit splitting the white light into predetermined color lights and uniformizing an illuminance distribution of the predetermined color lights; and
an image generator including a display element that modulates the predetermined color lights uniformized by the lighting unit, according to an image signal, and a projection lens that emits and projects an image light including the predetermined color lights modulated along a third optical axis, wherein the first optical axis, the second optical axis, and the third optical axis are substantially parallel to each other, and a direction of light travel along the first optical axis and the third optical axis is opposite to a direction of light travel along the second optical axis.

10. The projection display device according to claim 9, wherein, with respect to a plane formed by any two optical axes among the first optical axis, the second optical axis, and the third optical axis, one optical axis other than the any two optical axes is located on a plane different from the plane.

11. A projection display device comprising:
a light source unit that generates and emits a white light along a first optical axis;
a lighting unit provided on a second optical axis, the lighting unit splitting the white light into predetermined color lights and uniformizing an illuminance distribution of the predetermined color lights;
an image generator including a display element that modulates the predetermined color lights uniformized by the lighting unit, according to an image signal, and a projection lens that emits and projects an image light including the predetermined color lights modulated along a third optical axis; and
a light diffuser including a diffusion optical system that spreads the white light to a desired illumination area and projects the spread white light as an illumination light, wherein
the first optical axis and the third optical axis are substantially parallel to each other.

12. The projection display device according to claim 11, wherein the light diffuser includes a high color rendering conversion optical element that increases color rendering properties of the white light entering the light diffuser and outputs the white light.

13. The projection display device according to claim 11, wherein the first optical axis, the second optical axis, and the third optical axis are substantially parallel to each other, and a direction of light travel along the first optical axis and the third optical axis is opposite to a direction of light travel along the second optical axis.

14. The projection display device according to claim 11, wherein emitting directions of light along the first optical axis and the second optical axis are perpendicular to each other.

* * * * *